US011299985B2

(12) United States Patent
Stark et al.

(10) Patent No.: US 11,299,985 B2
(45) Date of Patent: Apr. 12, 2022

(54) ACOUSTIC TELEMETRY SYSTEM

(71) Applicant: HALLIBURTON ENERGY SERVICES, INC., Houston, TX (US)

(72) Inventors: Daniel Joshua Stark, Houston, TX (US); Patrick John Jonke, Houston, TX (US); Li Gao, Katy, TX (US); Yao Ge, Singapore (SG); Alexis Garcia, The Woodlands, TX (US); John L. Maida, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 44 days.

(21) Appl. No.: 16/634,778

(22) PCT Filed: Feb. 13, 2019

(86) PCT No.: PCT/US2019/017775
§ 371 (c)(1),
(2) Date: Jan. 28, 2020

(87) PCT Pub. No.: WO2020/167301
PCT Pub. Date: Aug. 20, 2020

(65) Prior Publication Data
US 2021/0231008 A1 Jul. 29, 2021

(51) Int. Cl.
*E21B 47/16* (2006.01)
*G01V 1/22* (2006.01)
(Continued)

(52) U.S. Cl.
CPC ............... *E21B 47/16* (2013.01); *G01V 1/22* (2013.01); *G01V 1/48* (2013.01); *E21B 19/22* (2013.01)

(58) Field of Classification Search
CPC combination set(s) only.
See application file for complete search history.

(56) References Cited

U.S. PATENT DOCUMENTS 4,802,143 A * 1/1989 Smith .................. E21B 49/005
367/82
6,434,084 B1 8/2002 Schultz
(Continued)

FOREIGN PATENT DOCUMENTS

DE 102008050258 A1 * 4/2010 ........... G01B 11/303

OTHER PUBLICATIONS

Bichmann et al., Die folgenden Angaben sind den vom Anmelder eingereichten Unterlagen entnommen, (English translation of German Patent application DE102008050258A1). (Year: 2010).*
(Continued)

*Primary Examiner* — Nabil H Syed
*Assistant Examiner* — Cal J Eustaquio
(74) *Attorney, Agent, or Firm* — Polsinelli PC

(57) ABSTRACT

An acoustic receiver is provided. The acoustic receiver includes an optical vibrometer having an optical emitter and an optical receiver. The optical receiver is operable to emit an optical beam to a single point of reference on a conduit, and the optical receiver is operable to receive one or more reflections of the optical beam off of the single point of reference on the conduit, thereby detecting waves propagating through the conduit created by an acoustic transmitter. A processor is coupled with the optical emitter and the optical receiver. The processor is operable to: determine components of the waves created by the acoustic transmitter based on the one or more reflections of the optical beam; and determine a signal transmitted from the acoustic transmitter based on the components of the waves.

20 Claims, 9 Drawing Sheets

(51) Int. Cl.
*G01V 1/48* (2006.01)
*E21B 19/22* (2006.01)

(56) References Cited

U.S. PATENT DOCUMENTS

| | | | |
|---|---|---|---|
| 6,781,699 B2* | 8/2004 | Dunn | G01B 9/02081 |
| | | | 356/511 |
| 6,859,419 B1 | 2/2005 | Blackmon et al. | |
| 6,956,791 B2 | 10/2005 | Dopf et al. | |
| 7,158,446 B2 | 1/2007 | Gardner et al. | |
| 7,817,061 B2 | 10/2010 | Camwell et al. | |
| 7,928,861 B2 | 4/2011 | Camwell et al. | |
| 8,982,667 B2 | 3/2015 | Camwell et al. | |
| 2004/0075842 A1* | 4/2004 | Dunn | G01B 9/02081 |
| | | | 356/511 |
| 2005/0012935 A1 | 1/2005 | Kersey | |
| 2007/0258326 A1 | 11/2007 | Camwell et al. | |
| 2008/0013403 A1* | 1/2008 | Camwell | E21B 47/16 |
| | | | 367/82 |
| 2010/0200296 A1* | 8/2010 | Camwell | E21B 47/0224 |
| | | | 175/50 |
| 2016/0177709 A1 | 6/2016 | Li et al. | |

OTHER PUBLICATIONS

Mcdevitt, Timothy E., "Development and Evaluation of Laser Doppler Techniques for Measurements of Flexural and Longitudinal Structural Intensity," Technical Report No. TR 91-013; Oct. 1991; The Pennsylvania State University; Applied Research Laboratory.

Perrone, G. et al., "A Low Cost Optical Sensor for Non Contact Vibration Measurements", Instrumentation and Measurement, IEEE Transactions on (vol. 58, Issue: 5); May 2009.

International Search Report and Written Opinion; PCT Application No. PCT/US2019/017775; dated Feb. 13, 2019.

* cited by examiner

ACOUSTIC TELEMETRY SYSTEM

CROSS-REFERENCE TO RELATED APPLICATIONS

This application is a national stage entry of PCT/US2019/017775 filed Feb. 13, 2019, said application is expressly incorporated herein in its entirety.

FIELD

The present disclosure relates generally to acoustic telemetry systems used in a wellbore system. In at least one example, the present disclosure relates to acoustic telemetry systems including a receiver to measure vibration of a wellbore system.

BACKGROUND

Wellbores are drilled into the earth for a variety of purposes including accessing hydrocarbon bearing formations. A variety of downhole tools may be used within a wellbore in connection with accessing and extracting such hydrocarbons. The downhole tools may require instructions and/or may need to pass along data obtained by the downhole tools. Telemetry is often performed via an electrical cable or fiber optic cable inside a conduit, for example coiled tubing. In the absence of such a wired telemetry system, downhole tools may need to be set via a timing mechanism, or triggered by a mechanical event from the surface.

BRIEF DESCRIPTION OF THE DRAWINGS

Implementations of the present technology will now be described, by way of example only, with reference to the attached figures, wherein.

DETAILED DESCRIPTION

Figure 1A:
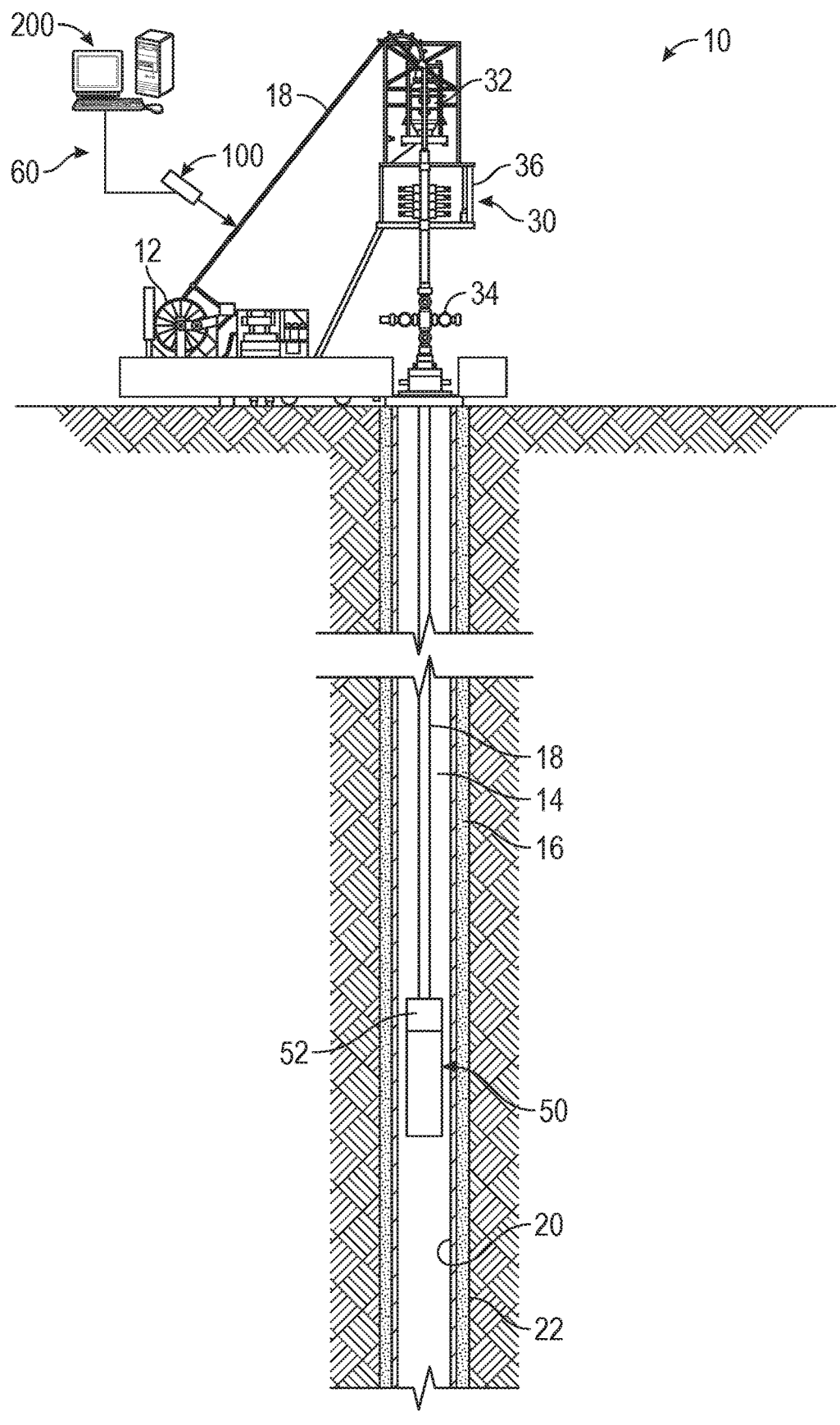
FIG. 1A is a diagram illustrating an exemplary environment for an acoustic telemetry system according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Disclosed herein is an acoustic telemetry system for use in a wellbore system, which can include any or all of the following features or aspects in any given example. The acoustic telemetry system includes an acoustic receiver to receive signals conveyed by an acoustic transmitter. The acoustic transmitter can be operable to convey signals to the acoustic receiver by inducing vibrations such that compressional, torsional, and/or flexural waves are propagated through the conduit. The waves can include components such as, for example, longitudinal components, flexural components, axial components, torsional components, velocities, accelerations, angular velocities, angular accelerations, angular displacement, and/or displacement. For example, the acoustic transmitter may impact the conduit at predetermined frequencies, directions and/or intensities such that waves corresponding to the predetermined frequencies, directions, and/or intensities propagate through the conduit to the acoustic receiver.

The acoustic receiver includes an optical vibrometer which includes an optical emitter and an optical receiver. The optical emitter can emit at least one optical beam to a single point of reference on a conduit. The at least one optical beam reflects off of the conduit, and the optical receiver receives at least some of the reflections of the optical beam off of the single point of reference on the conduit. In some examples, the optical beams emitted can form an interference pattern that can be detected, imaged, and/or measured. Based on the reflections, the acoustic receiver is able to detect compressional, torsional, and/or flexural waves of the conduit created by the acoustic transmitter. Based on the detected compressional, torsional, and/or flexural waves, the acoustic receiver is able to determine the signal transmitted from the acoustic transmitter.

Accordingly, the acoustic receiver as disclosed herein can determine signals from an acoustic transmitter where only one point of reference is needed. As such, the system can be simplified as another point of reference is not necessary to interpret the signal.

Note that, in at least one example, more than one point of reference may be utilized. By having multiple points of references, the acoustic receiver can, for example, reduce noise and more accurately determine the signals. However, the acoustic receiver is able to determine the signal independently from each point of reference, and the combination of the determined signals can be processed to increase the signal-to-noise ratio. Accordingly, the system as disclosed herein does not require a separate, stable location as a second reference point.

Figure 1B:
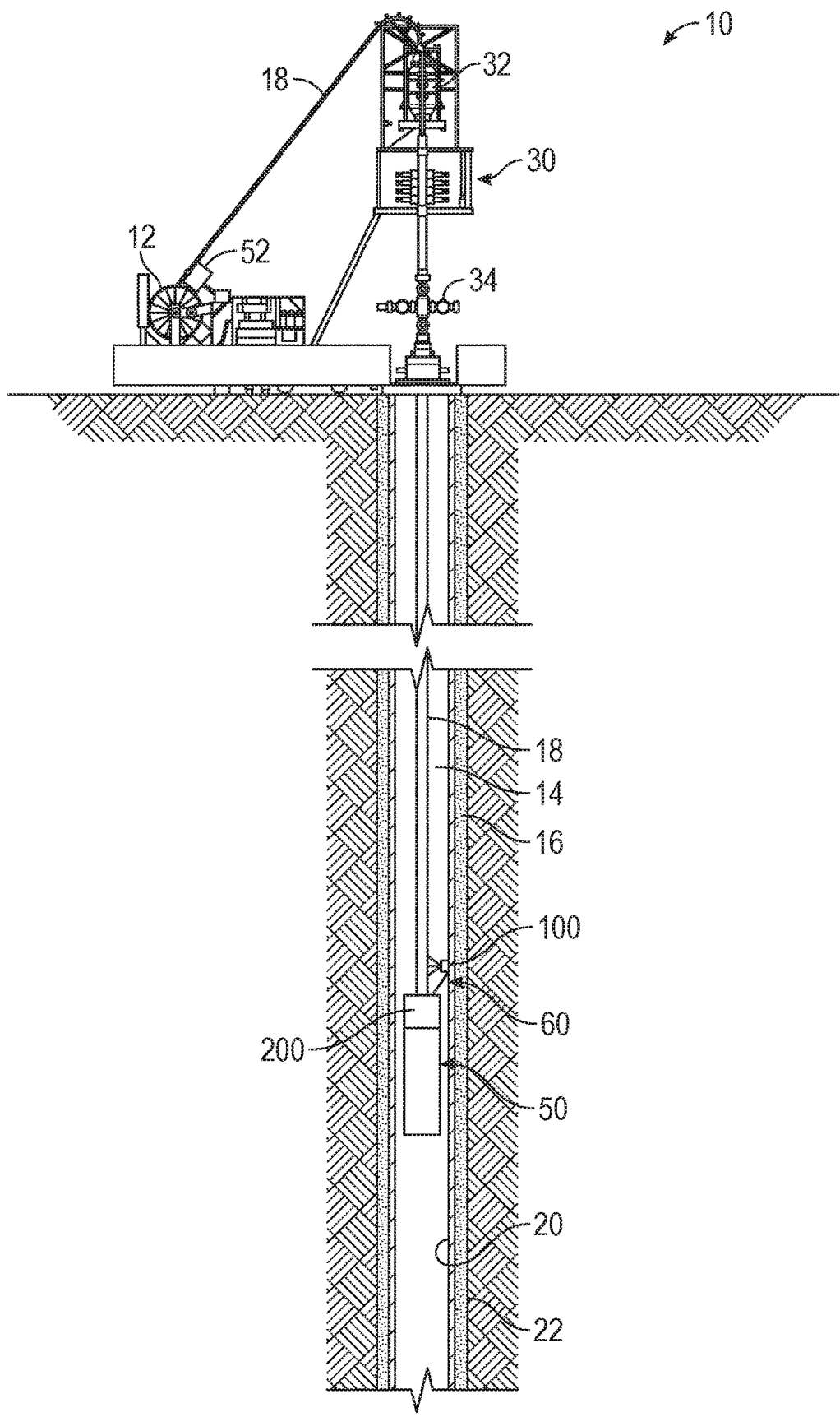
FIG. 1B is a diagram another exemplary configuration of the acoustic telemetry system.

The system can be employed in an exemplary wellbore system 10 shown, for example, in FIGS. 1A and 1B. A system 10 for an acoustic receiver 100 includes a wellhead 30 extending over and around a wellbore 14. The wellbore 14 is within an earth formation 22 and, in at least one example, can have a casing 20 lining the wellbore 14. The casing 20 can be held into place by cement 16. In at least one example, the casing 20 can be at least partially made of an electrically conductive material, for example steel. In another example, the casing 20 can be at least partially made of a non-electrically conductive material, for example fiberglass or PEEK, or of a low-conductivity material, for example carbon composite, or a combination of such materials. A downhole tool 50 can be disposed within the wellbore 14 and moved down the wellbore 14 via a conduit 18 to a desired location. As illustrated in FIGS. 1A and 1B, the conduit 18 is coiled tubing. In other examples, the conduit 18 can be, for example, tubing-conveyed, wireline, slickline, work string, joint tubing, jointed pipe, pipeline, and/or any other suitable means. The downhole tools 50 can include, for example, downhole sensors, chokes, and valves. The chokes and valves may include actuatable flow regulation devices, such as variable chokes and valves, and may be used to regulate the flow of the fluids into and/or out of the conduit 18.

The wellhead 30 can include a blowout preventer 34, a stripper 36, and/or an injector 32. The injector 32 can inject the conduit 18 into the wellbore 14. For example, the conduit 18 can be stored in a reel 12, and the conduit 18 passes from the reel 12 through the injector 32 into the wellbore 14. In other examples, the injector 32 can pull the conduit 18 to retrieve the conduit 18 from the wellbore 14. The stripper 36 can provide a pressure seal around the conduit 18 as the conduit 18 is being run into and/or pulled out of the wellbore 14. The blowout preventer 34 can seal, control, and/or monitor the wellbore 14 to prevent blowouts, or uncontrolled and/or undesired release of fluids from the wellbore 14. In other examples, different systems can be utilized based on the type of conduit 18 and/or the environment such as subsea or surface operations.

It should be noted that while FIGS. 1A and 1B generally depicts a land-based operation, those skilled in the art would readily recognize that the principles described herein are equally applicable to operations that employ floating or sea-based platforms and rigs, without departing from the scope of the disclosure. Also, even though FIGS. 1A and 1B depicts a vertical wellbore, the present disclosure is equally well-suited for use in wellbores having other orientations, including horizontal wellbores, slanted wellbores, multilateral wellbores or the like.

The system 10 can include an acoustic transmitter 52 and an acoustic receiver 60. The acoustic transmitter 52 can be operable to convey signals to the acoustic receiver 60 by inducing vibrations such that compressional, torsional, and/or flexural waves are propagated through the conduit 18. While the disclosure herein discusses compressional waves, the waves can be compressional, torsional, and/or flexural waves. The waves can include components such as, for example, longitudinal components, flexural components, axial components, torsional components, velocities, accelerations, angular velocities, angular accelerations, angular displacement, and/or displacement. The acoustic transmitter 52 can include at least one of a piezoelectric transducer, an Electro-Magnetic Acoustic Transducer, a pinger, a voice coil, and/or a phased acoustic array. The acoustic receiver 60 can include an optical vibrometer 100 which can emit at least one optical beam to a single point of reference on the conduit 18 and receive one or more reflections of the at least one optical beam off of the single point of reference on the conduit 18. Accordingly, the acoustic receiver 60 can detect compressional, torsional, and/or flexural waves propagating through the conduit 18 created by the acoustic transmitter 52.

The optical vibrometer 100 can be coupled with a controller 200, which will be discussed in further detail in FIG. 2. The controller 200 can receive the data from the optical vibrometer 100 and determine the compressional, torsional, and/or flexural waves propagating through the conduit 18 created by the acoustic transmitter 52 based on the one or more reflections of the at least one optical beam. The controller 200 can determine a signal transmitted from the acoustic transmitter 52 based on the waves propagating through the conduit 18. Accordingly, the acoustic receiver 100 can retrieve signals from the acoustic transmitter 52 by emitting at least one optical beam at only one single point of reference.

In some examples, the acoustic receiver 60 may not be in contact with the rest of the system 10 including the conduit 18. In some examples, the acoustic receiver 60 may be coupled with the conduit 18 by a stand which protrudes from the conduit 18 and/or a casing. However, the acoustic receiver 60 can function without being in direct contact with the conduit 18. In at least one example, the acoustic receiver 60 can be removably coupled with the system 10. For example, the acoustic receiver 60 can be removed and/or installed independently from the rest of the system 10. Accordingly, the acoustic receiver 60 can be independently delivered, installed in, and/or removed from any system 10 including a conduit 18 and an acoustic transmitter 52 without disturbing the system 10. Additionally, the acoustic receiver 60 can be installed even while operations, such as coiled tubing operations, are being undertaken.

As illustrated in FIG. 1A, the acoustic transmitter 52 is disposed within the wellbore 14. In at least one example, the acoustic transmitter 52 is communicatively coupled with the downhole tool 50. In at least one example, the acoustic transmitter 52 is part of the downhole tool 50, such that the downhole tool 50 can be shipped and disposed within the wellbore 14 along with the acoustic transmitter 52. The acoustic transmitter 52, as illustrated in FIG. 1A, can be coupled with the conduit 18 such that the acoustic transmitter 52 can induce the conduit 18 to vibrate, compress, rotate, and/or expand such that waves are propagated through the conduit 18 to the acoustic receiver 60 disposed uphole of the acoustic transmitter 52 and/or on the surface. For example, the acoustic transmitter 52 can receive data such as temperature and/or pressure measurements from the downhole tool 50. The acoustic transmitter 52 conveys the data to the acoustic receiver 100 by creating a signal using waves propagating through the conduit 18. The acoustic receiver 60 can emit light and receive reflections from one single point of reference on the conduit 18 to detect the waves propagating through the conduit 18 created by the acoustic transmitter 52. The acoustic receiver 60 can then determine components of the waves based on the reflections of the optical beam. The components of the waves can include, for example, longitudinal components, flexural components, axial components, torsional components, velocities, accelerations, angular velocities, angular accelerations, angular displacement, and/or displacement. Based on the components of the compressional waves, the acoustic receiver 60 can determine the signal transmitted from the acoustic transmitter 52. After demodulating the signal, the acoustic receiver 60 can determine the data being conveyed by the acoustic transmitter 52.

As illustrated in FIG. 1A, the acoustic receiver 60 can be positioned between the injector 32 and the reel 12 at a side of the system 10 with a lower pressure. In some examples, the acoustic receiver 60 can be positioned to measure waves propagating through the conduit 18 through the blowout preventer 34, and/or the stripper 36 at the side of the system 10 with a higher pressure. In such an example, a window may be installed such that light can be transmitted through the blowout preventer and/or the stripper 36 to the conduit 18. In some examples, the acoustic receiver 60 can be positioned to measure components of waves propagating through the conduit 18 at the injector 32. In some examples, the acoustic receiver 60 can be positioned in the wellbore 14 and coupled with another downhole tool.

As illustrated in FIG. 1B, the acoustic receiver 60 can be disposed in the wellbore 14 and communicatively coupled with a downhole tool 50. For example, the optical vibrometer 100 can be coupled with, but not in contact with, the conduit 18. In at least one example, the optical vibrometer 100 can be coupled with the conduit 18 by a casing, a centralizer, and/or any other suitable coupling mechanism so long as the optical vibrometer 100 is protected from the environment in the wellbore 14. For example, the optical vibrometer 100 can be protected from pressure within the wellbore 14 and maintain a low pressure environment for the optical vibrometer 100. The optical vibrometer 100 can be communicatively coupled with the controller 200, which is communicatively coupled with the downhole tool 50.

As illustrated in FIG. 1B, the acoustic transmitter 52 is disposed uphole from the downhole tool 50 and the acoustic receiver 60. As illustrated in FIG. 1B, the acoustic transmitter 52 is disposed between the wellhead 30 and the reel 12. In other examples, the acoustic transmitter 52 can be disposed in any other suitable location such as within the wellbore 14 below the wellhead 30 and/or after the injector 32. The acoustic transmitter 52 can convey signals to the acoustic receiver 60 by inducing vibrations such that compressional, torsional, and/or flexural waves are propagated through the conduit 18. For example, the acoustic transmitter 52 can include at least one of a piezoelectric transducer, an Electro-Magnetic Acoustic Transducer, a pinger, a voice coil, and/or a phased acoustic array. The signals can include data such as instructions for the downhole tool 50.

The acoustic receiver 60 can emit light and receive reflections from one single point of reference on the conduit 18 to detect the waves propagating through the conduit 18 created by the acoustic transmitter 52. In some examples, the emitted light can form an interference pattern that can be detected. The acoustic receiver 60 can then determine components of the waves based on the reflections of the optical beam. The components of the waves can be, for example, longitudinal components, torsional components, velocities, accelerations, angular velocities, angular accelerations, angular displacement, and/or displacement. Based on the components of the waves, the acoustic receiver 60 can determine the signal transmitted from the acoustic transmitter 52. After demodulating the signal, the acoustic receiver 60 can determine the data being conveyed by the acoustic transmitter 52. For example, if the data from the acoustic transmitter 52 includes instructions for the downhole tool 50 and transmits compressional waves, the optical vibrometer 100 can detect the compressional waves and transmit the detected measurements to the controller 200. The controller 200 may then determine the signal transmitted from the acoustic transmitter 52 based on the components of the compressional waves, demodulate the signal to determine the data, and provide the instructions to the downhole tool 50 to conduct an operation. For example, if the downhole tool 50 includes a valve, the instructions may include opening or closing the valve.

To determine the signal from the components of the waves, the wave is demodulated. For example, in a simple frequency shift keying (FSK) modulation using compressional wave, the acoustic transmitter 52 can generate compressional acoustic waves at two distinct frequencies $f1$ and $f2$ to represent the binary 1 and 0. The signal can be coded using sequences of these two frequencies. The optical vibrometer 100 is able to detect the two frequencies as time sequences and demodulates the components of the wave to determine the original transmitted binary sequence.

In at least one example, the acoustic receiver 60 can include a time of flight-based laser system such as LIDAR. The laser system can be utilized to extract the flexural component of the compressional wave propagating through the conduit 18. In some examples, a Doppler LIDAR video imaging system can be included to monitor the entire conduit 18 simultaneously. Other laser systems which can be included, for example, are Doppler vibrometers, laser Doppler velocimeters, laser microphones, laser scanning vibrometers, optical phased array LIDAR, flash LIDAR, spinning LIDAR, mechanical scanning LIDAR, frequency modulated continuous-wave LIDAR, amplitude-modulated continuous wave LIDAR, and/or time-of-flight LIDAR. In some examples, the Doppler LIDAR video imaging system can monitor both flexural and longitudinal components. Additionally or alternately, in some examples, an intensity based vibrometer system can be included.

In at least one example, when the conduit 18 is positioned as desired, the conduit 18 can be moved up and down a predetermined distance in a continuous periodic or aperiodic fashion to ensure the conduit 18 continues to experience kinetic, instead of static, friction. For example, the conduit 18 can be moved up and down a predetermined distance, for example between about 3 inches and about 50 feet. When experiencing kinetic friction, the acoustic wave propagating along the conduit in the system 10 experiences significantly less attenuation in regions contacting the casing 20 and/or the wellbore 14. Any deleterious effects of comb filtering as result of periodic or pseudo-periodic contacts between the conduit 18 and wellbore casing 20 can be avoided by properly select frequencies of the acoustic wave generated by the acoustic transmitter 52.

Figure 2:
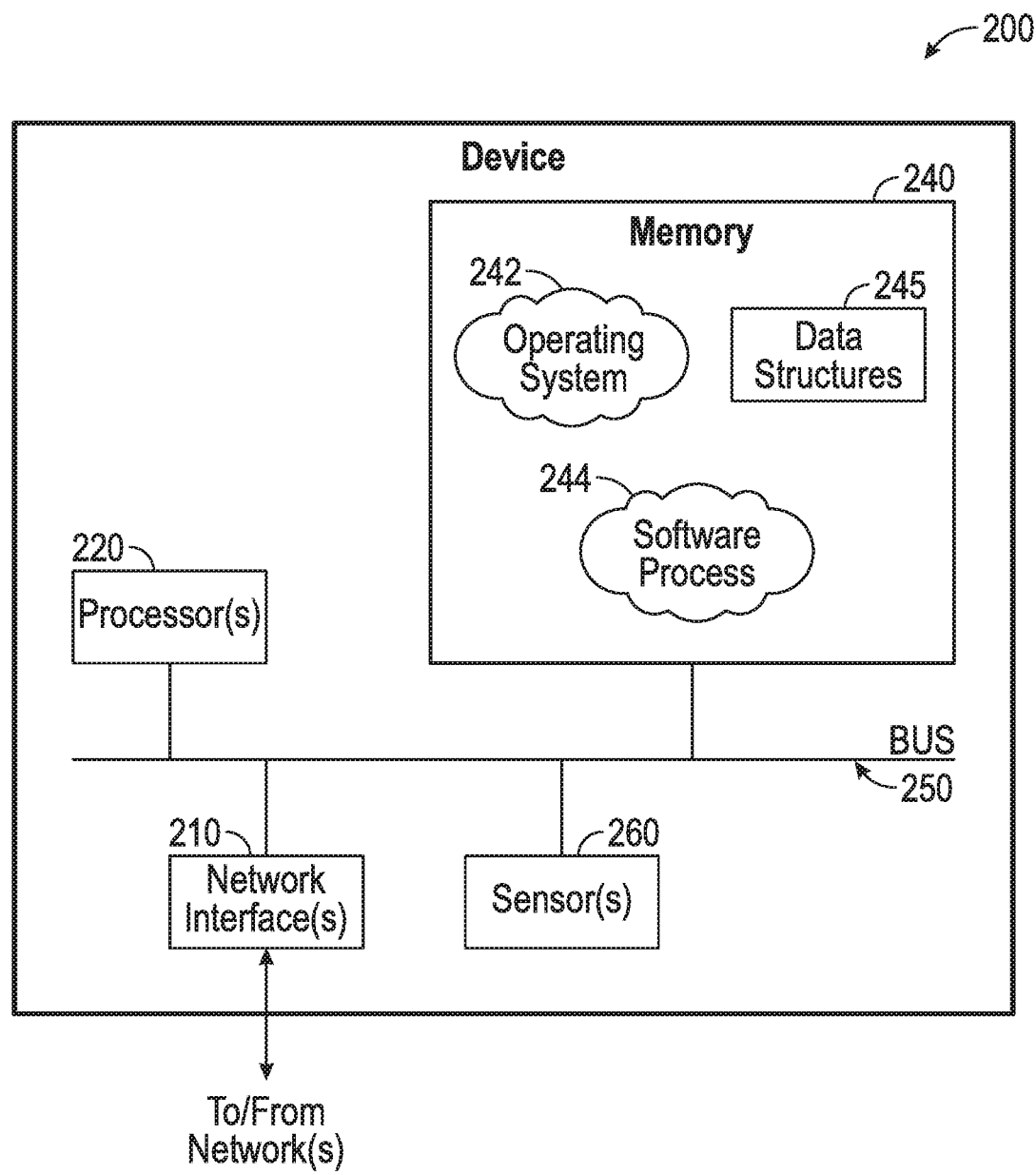
FIG. 2 is a diagram of a processing system which may be employed as shown in FIGS. 1A and 1B.

FIG. 2 is a block diagram of an exemplary controller 200. Controller 200 is configured to perform processing of data and communicate with the optical vibrometer 100, for example as illustrated in FIGS. 1A and 1B. In operation, controller 200 communicates with one or more of the above-discussed components, for example the optical vibrometer 100, and may also be configured to communication with remote devices/systems.

As shown, controller 200 includes hardware and software components such as network interfaces 210, at least one processor 220, sensors 260 and a memory 240 interconnected by a system bus 250. Network interface(s) 210 can include mechanical, electrical, and signaling circuitry for communicating data over communication links, which may include wired or wireless communication links. Network interfaces 210 are configured to transmit and/or receive data using a variety of different communication protocols, as will be understood by those skilled in the art.

Processor 220 represents a digital signal processor (e.g., a microprocessor, a microcontroller, or a fixed-logic processor, etc.) configured to execute instructions or logic to perform tasks in a wellbore environment. Processor 220 may include a general purpose processor, special-purpose processor (where software instructions are incorporated into the processor), a state machine, application specific integrated circuit (ASIC), a programmable gate array (PGA) including a field PGA, an individual component, a distributed group of processors, and the like. Processor 220 typically operates in conjunction with shared or dedicated hardware, including but not limited to, hardware capable of executing software and hardware. For example, processor 220 may include elements or logic adapted to execute software programs and manipulate data structures 245, which may reside in memory 240.

Sensors 260 typically operate in conjunction with processor 220 to perform measurements, and can include special-purpose processors, detectors, transmitters, receivers, and the like. In this fashion, sensors 260 may include hardware/software for generating, transmitting, receiving, detection, logging, and/or sampling magnetic fields, seismic activity, and/or acoustic waves, temperature, pressure, or other parameters. Additionally, sensors 260 may include the optical vibrometer 100 as disclosed herein.

Memory 240 comprises a plurality of storage locations that are addressable by processor 220 for storing software programs and data structures 245 associated with the embodiments described herein. An operating system 242, portions of which may be typically resident in memory 240 and executed by processor 220, functionally organizes the device by, inter alia, invoking operations in support of software processes and/or services 244 executing on controller 200. These software processes and/or services 244 may perform processing of data and communication with controller 200, as described herein. Note that while process/service 244 is shown in centralized memory 240, some examples provide for these processes/services to be operated in a distributed computing network.

It will be apparent to those skilled in the art that other processor and memory types, including various computer-readable media, may be used to store and execute program instructions pertaining to the fluidic channel evaluation techniques described herein. Also, while the description illustrates various processes, it is expressly contemplated that various processes may be embodied as modules having portions of the process/service 244 encoded thereon. In this fashion, the program modules may be encoded in one or more tangible computer readable storage media for execution, such as with fixed logic or programmable logic (e.g., software/computer instructions executed by a processor, and any processor may be a programmable processor, programmable digital logic such as field programmable gate arrays or an ASIC that comprises fixed digital logic. In general, any process logic may be embodied in processor 220 or computer readable medium encoded with instructions for execution by processor 220 that, when executed by the processor, are operable to cause the processor to perform the functions described herein.

Figure 3A:
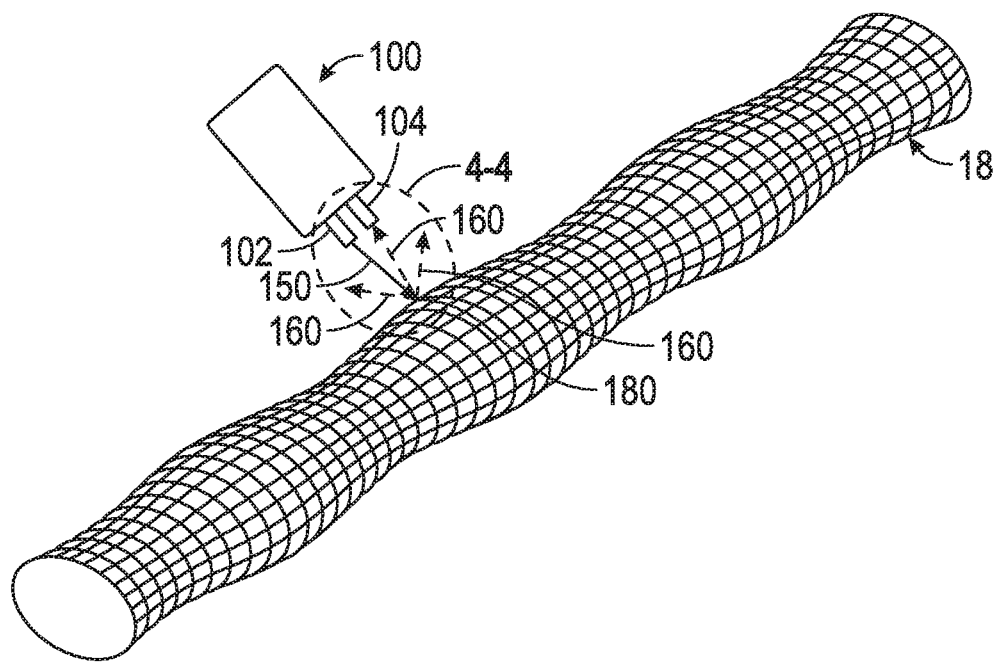
FIG. 3A is a diagram illustrating an exemplary acoustic receiver with an optical vibrometer in operation.

FIG. 3A illustrates an exemplary acoustic receiver 60 including the optical vibrometer 100. The waves propagating through the conduit 18 as illustrated in FIG. 3A are illustrative and may not be indicative of the relative amount of flexural expansion.

The optical vibrometer 100 is positioned and supported such that an optical beam 150 is focused on the conduit 18. The optical vibrometer 100 can include an optical emitter 102 and an optical receiver 104. The optical emitter 102 is operable to emit an optical beam 150 to a single point of reference 180 on the conduit 18. In at least one example, the optical beam 150 can have a wavelength between about 100 nm and about 10,000 nm. The optical beam 150 reflects off of and/or interferes at the single point of reference 180 of the conduit 18, and the reflections 160 can scatter and/or reflect back to the optical receiver 104. The optical receiver 104 is operable to receive one or more of the reflections 160 of the optical beam 150 off of the single point of reference on the conduit 18. While FIG. 3A illustrates that the optical emitter 102 and the optical receiver 104 are separate components, in at least one example, the optical emitter 102 and the optical receiver 104 can be one component. In some examples, the optical emitter 102 and the optical receiver 104 may be independent and separate components and are not housed in the same device. In some examples, the optical receiver 104 can either be positioned near the optical emitter 102, or at any angle to receive the reflections 160. In at least one example, the optical emitter 102 and optical receiver 104 can be time gated and share a time reference to permit distance resolution with LIDAR techniques. In at least one example, at least two optical receivers 104 can be included to extract out two or more waves, for example both torsional and compressional waves simultaneously. In some examples, a single optical receiver 104 can be rotated to extract compressional waves and then separately, the optical receiver 104 can be rotated to extract torsional waves.

In at least one example, the optical beam 150 reflects off of the conduit 18 directly. In some examples, the conduit 18 may include a reflector to enhance and/or deflect the reflection of the optical beam 150. In some examples, two optical vibrometers 100 can be utilized and/or the optical emitter 102 and the optical receiver 104 can be positioned separate from one another, the transmitted optical beam 150 and the reflections 160 can be separated. The conveyed signal from the acoustic transmitter 52 can be determined in such an example by cross correlation. In some examples, the conduit 18 may include a retroreflector such that the reflections 160 are directed back in the same path as the optical beam 150.

Figure 3B:
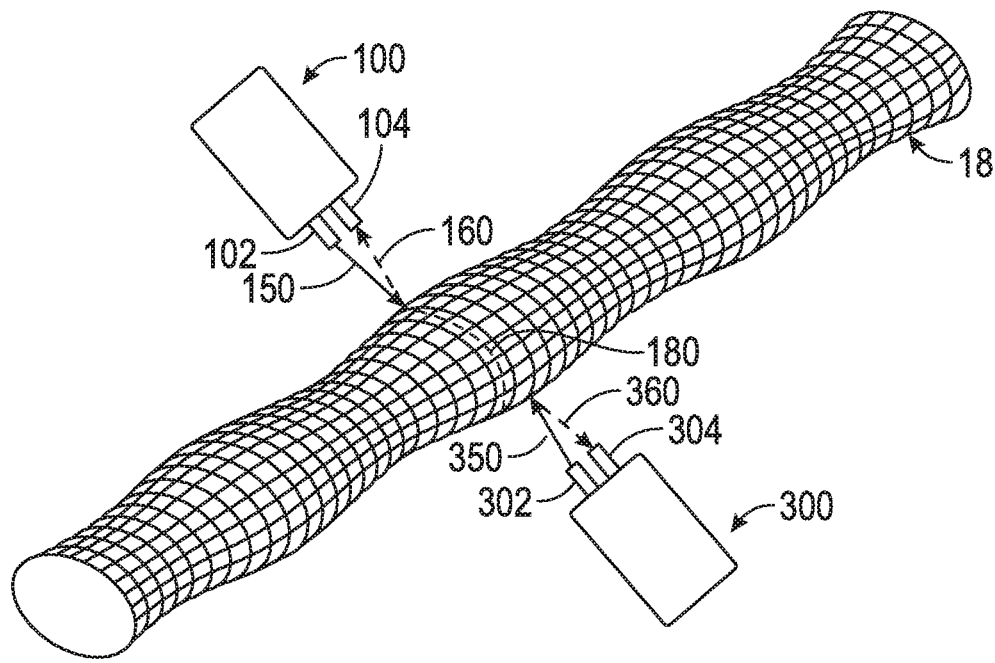
FIG. 3B is a diagram illustrating another example of an acoustic receiver with multiple optical vibrometers.

In some examples, as illustrated in FIG. 3B, multiple optical vibrometers 100, 300 can be included. For example, as illustrated in FIG. 3B, one optical vibrometer 100 emits an optical beam 150 and receives reflections 160 on a single point of reference 180 on the conduit 18. Another optical vibrometer 300 also emits an optical beam 350 and receives reflections 360 on the single point of reference 180 on the conduit 18. For example, optical vibrometer 100 may detect longitudinal components of the waves while optical vibrometer 300 may be rotated 90 degrees to detect torsional components of the waves. The controller 200 can receive the detected components of the waves and more accurately determine the signal conveyed by the acoustic transmitter 52.

In some examples, the one optical vibrometer 100 and another optical vibrometer 300 can be positioned on opposite sides of the conduit 18, for example 180 degrees from one another. In other examples, more than two optical vibrometers 100, 300 may be included. In at least one example, the optical vibrometers 100, 300 can be spaced equally apart from one another about the circumference of the conduit 18. In some examples, the optical vibrometers 100, 300 can be spaced at any desired and predetermined distance from one another. However, the optical vibrometers 100, 300 can all independently detect the compressional waves and do not need a second point of reference. Additionally, the single point of reference 180 can refer to a single longitudinal point of reference 180 on the conduit 18. For example, a single longitudinal point along the circumference of the conduit 18 can be the single point of reference 180.

Figure 4A:
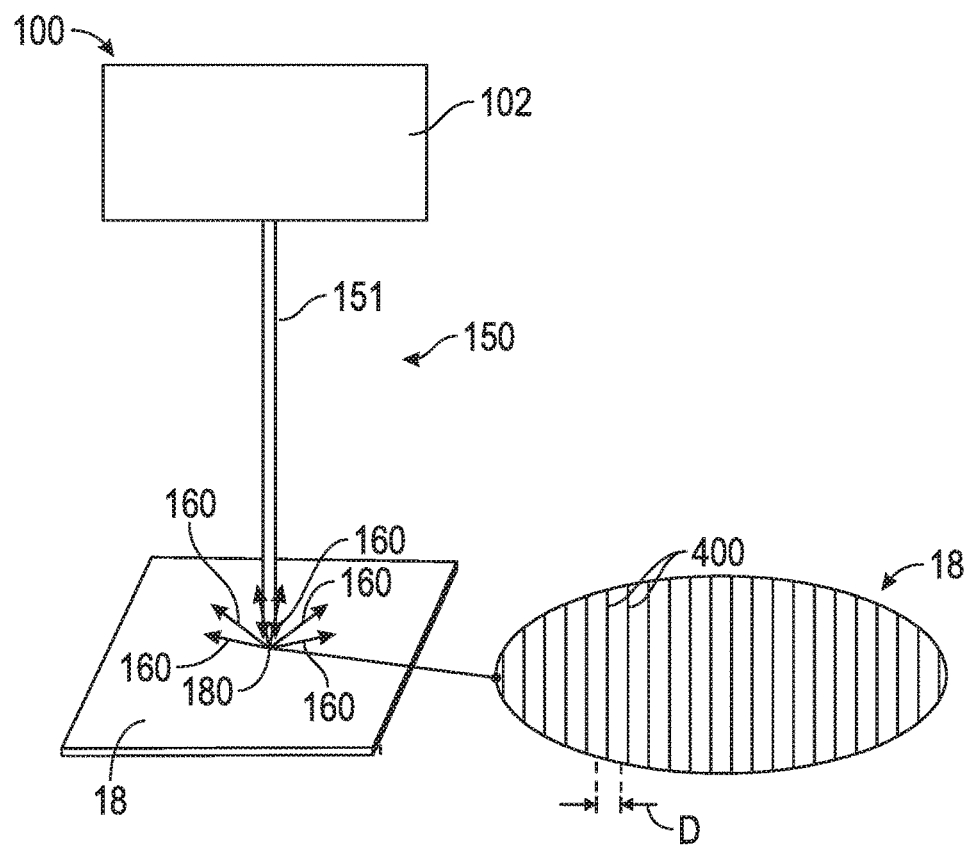
FIG. 4A is an enlarged diagram of region 4-4 of FIGS. 3A and 3B of an exemplary optical beam interacting with a conduit.
Figure 4B:
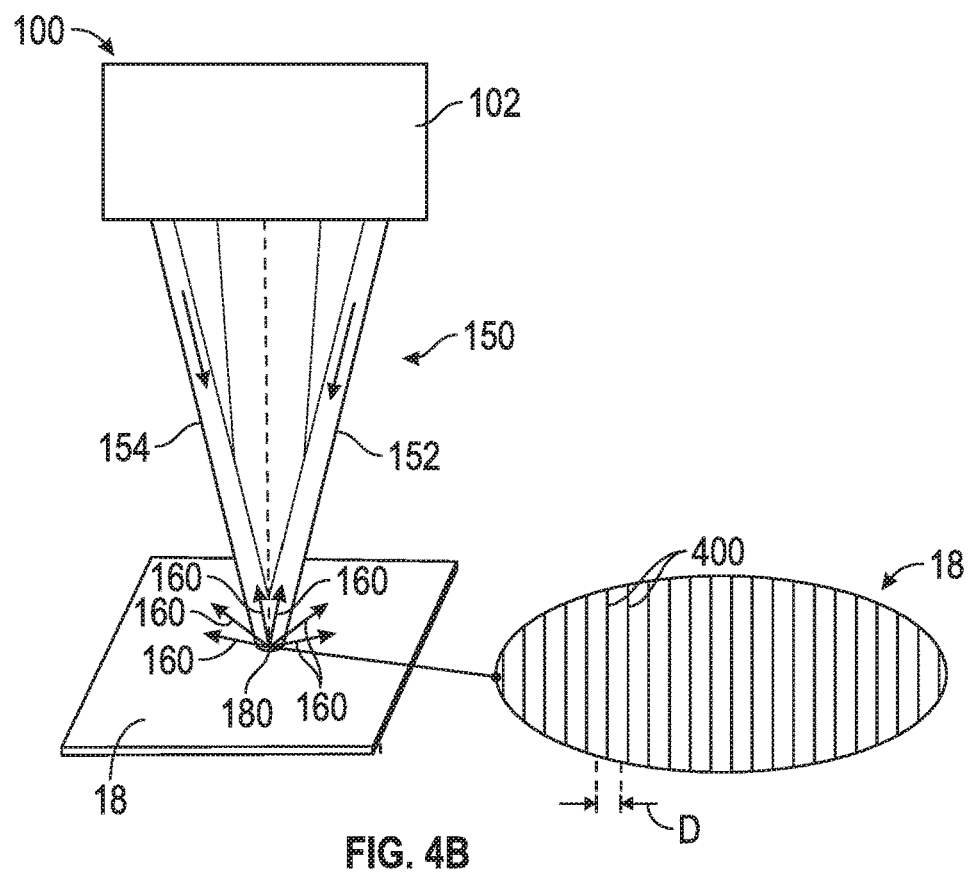
FIG. 4B is an enlarged diagram of region 4-4 of FIGS. 3A and 3B of another exemplary optical beam interacting with a conduit.

FIGS. 4A and 4B illustrate examples of optical beams 150 emitted from an optical emitter 102 of an optical vibrometer 100. FIG. 4A illustrates an optical beam 150 which includes one single beam 151 which is focused on the single point of reference 180 on the conduit 18, and the reflections 160 are scattered in different directions. As discussed before, in some examples, the reflections 160 may be focused in any desired direction.

Figure 5:
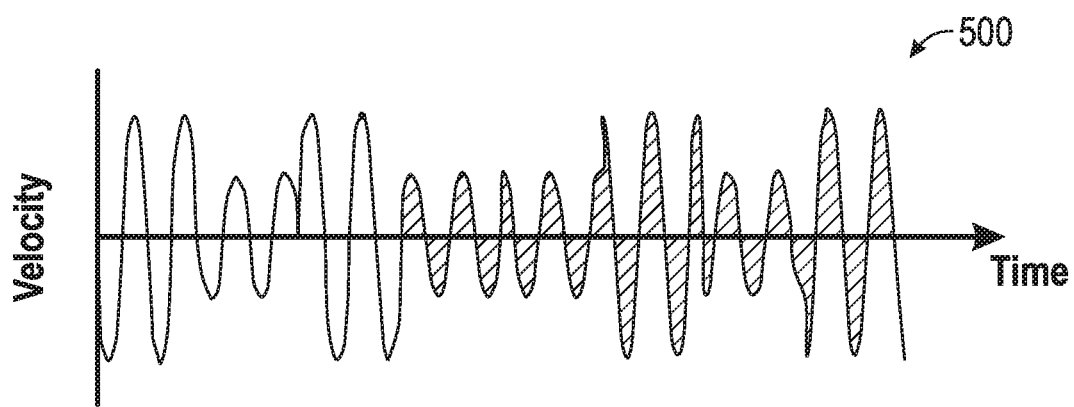
FIG. 5 is a chart of an example of a component of a compressional wave.
Figure 6:
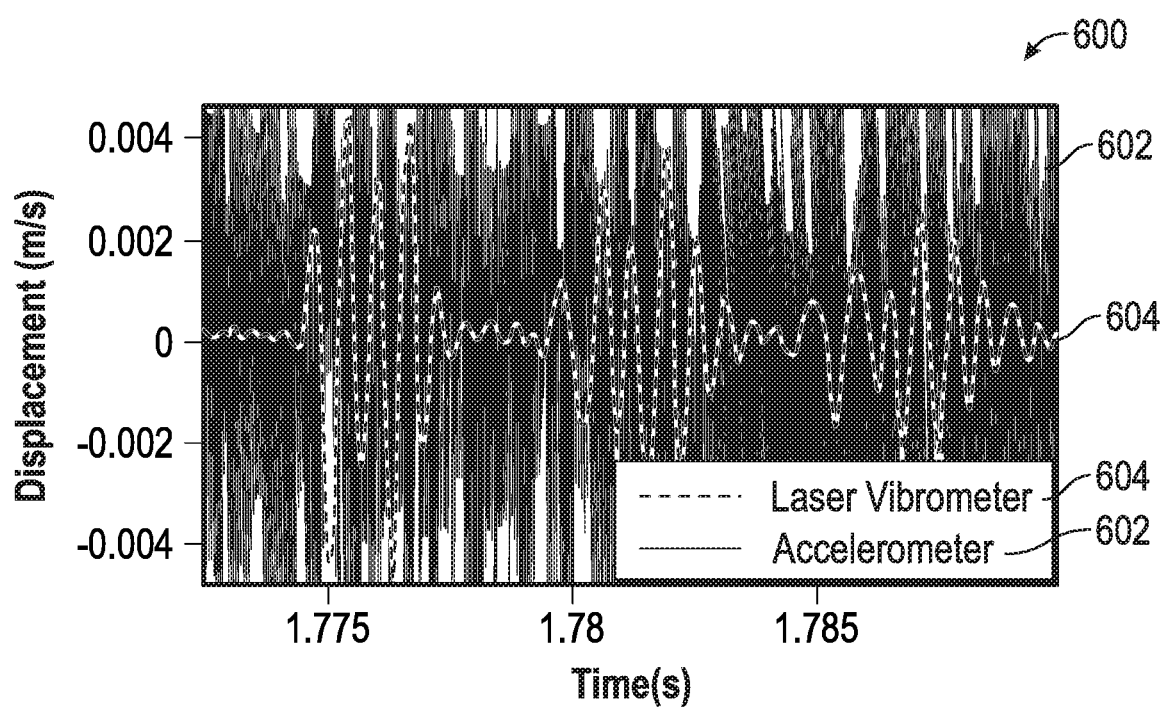
FIG. 6 is a chart of another example of a component of a compressional wave.

FIG. 4B illustrates an optical beam 150 which includes multiple beams 152, 154. As illustrated in FIG. 4B, the optical beam 150 includes two counter-propagating beams 152, 154 focused on one single point of reference 180 on the conduit 18. In other examples, more than two beams 152, 154 can be included so long as the optical beam 150 is focused on one single point of reference 180. In some examples, with multiple beams 152, 154, one or more of the beams 152, 154 can have a different orientation, for example rotated 90 degrees, and/or can have a different frequency f and/or a different frequency offset $f_b$. The two counter-propagating beams 152, 154 can have a frequency offset of $f_b$, with one beam 152 at f and the other beam 154 at $f+f_b$. At the focus of the two beams 152, 154, as illustrated in FIG. 4B, a set of interference patterns can develop with spacing $\Delta s$, and the reflections 160 may be frequency shifted by $f_{mod}$. Using the formula $v_p=(f_{mod}-f_b)\Delta s$, where $v_p$ is the velocity of the conduit 18 imaged at the focal point of reference 180, the velocity of the conduit 18 due to the longitudinal components of the compressional wave 400 can be extracted. In at least one example, at least one of the optical beams 150 can be rotated, for example 90 degrees, to extract out the torsional velocity. The longitudinal components of the compressional waves 400 can be spaced by distance D. As illustrated in FIGS. 4A and 4B, the distances D are equidistant from one another. In some examples, the distances D can be varied to convey the signal. An exemplary chart 500 of velocity of the conduit 18 due to a longitudinal wave is illustrated in FIG. 5. After appropriate processing by the controller 200, the velocity can be demodulated to obtain the digitized telemetry data. The raw data stream can be converted to engineering data that was generated and conveyed by the acoustic transmitter 52. In at least one example, as illustrated in the chart 600 of FIG. 6, the acoustic receiver 60 can reconstruct a displacement signal 604 as compared to a signal reconstructed from an accelerometer 602 fixed to the conduit 18. As shown in FIG. 6, the displacement signal 604 from the optical vibrometer 100 is much more defined.

In at least one example, if multiple optical vibrometers 100, 300 are included, at least two of the longitudinal, torsional, and flexural components of the compressional waves can simultaneously be detected. For example, if a pair of optical vibrometers 100, 300 are positioned opposite one another in relation to the conduit 18, the longitudinal (L(0, 1)), torsional (T(0,1)), and flexural (F(1,1)) components of the compressional waves can be extracted using the following formulas:

$$L_x(0,1)=(v_{x1}+v_{x2})/2,$$

$$L_z(0,1)=(v_{z1}-v_{z2})/2,$$

$$T_y(0,1)=(v_{y1}-v_{y2})/2,$$

$$F_x(1,1)=(v_{x1}-v_{x2})/2,$$

$$F_y(1,1)=(v_{y1}+v_{y2})/2,$$

$$F_z(1,1)=(v_{z1}+v_{z2})/2.$$

As there may be reflections of the compressional waves, in at least one example, the transmitted compressional waves can be separated from a reflected wave by using time gating. Additionally or alternately, the obtained signals can be compared to a library of known signals to separate transmitted and reflected waves. Additionally or alternately, the obtained signals can be cross-correlated if there are another set of vibrometers to measure components of the waves at another longitudinal location along the conduit 18. Based on the data obtained from the signals, adjustments can be made. For example, the data can include wellbore data such as temperature, pressure, and/or fluid composition taken from sensors of the downhole tool 50. The data can be received by the acoustic receiver 60, and input into logs and/or simulations. Based on such data, adjustments may be made such as closing sections of the well, stimulation of the formation, or any other suitable actions. Additionally, if the data is being transmitted to an acoustic receiver 60 disposed downhole and in communication with a downhole tool 50, the downhole tool 50 may be adjusted, for example opening or closing valves.

Figure 7A:
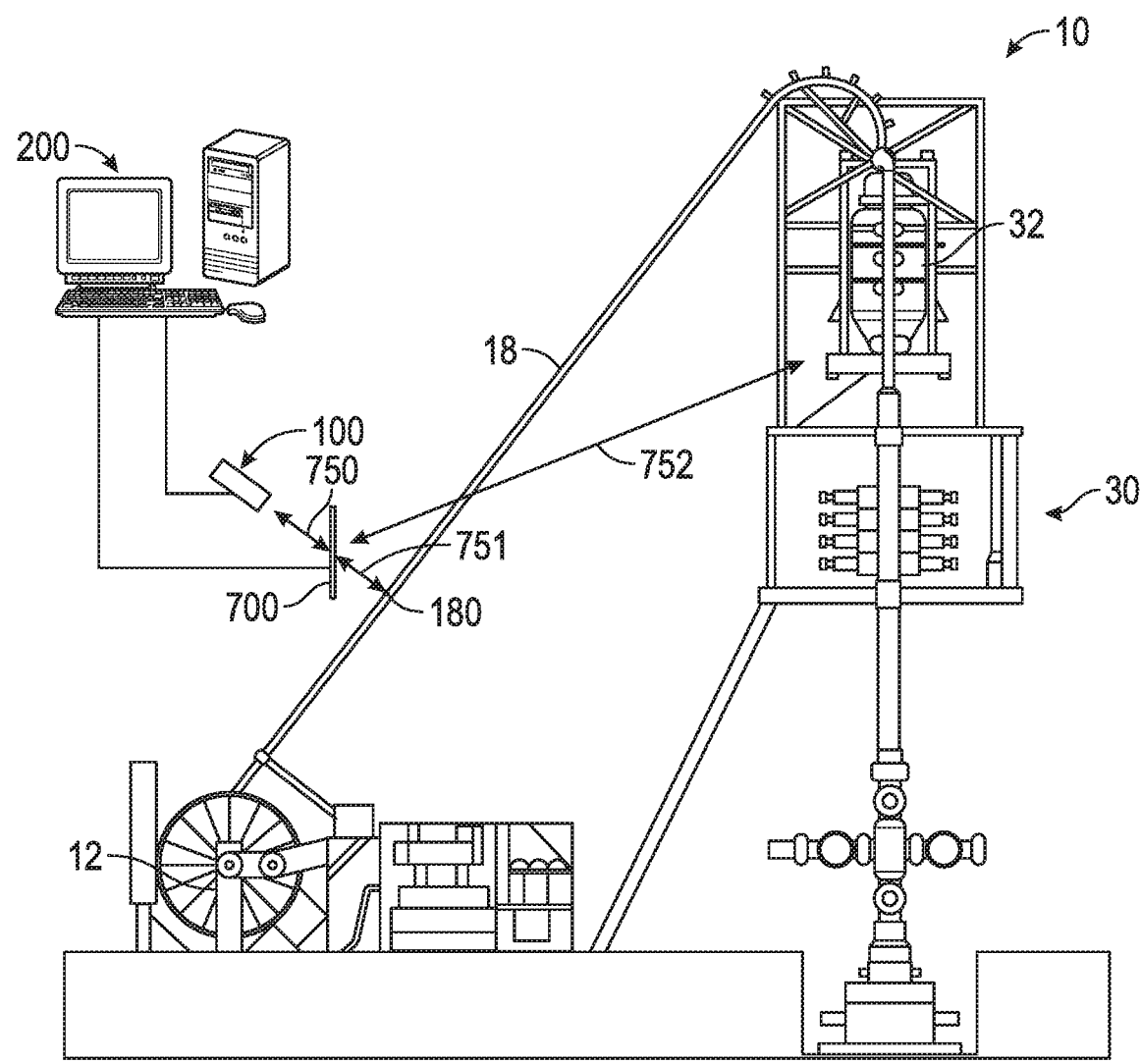
FIG. 7A illustrates an example of an acoustic receiver with a deflector.
Figure 7B:
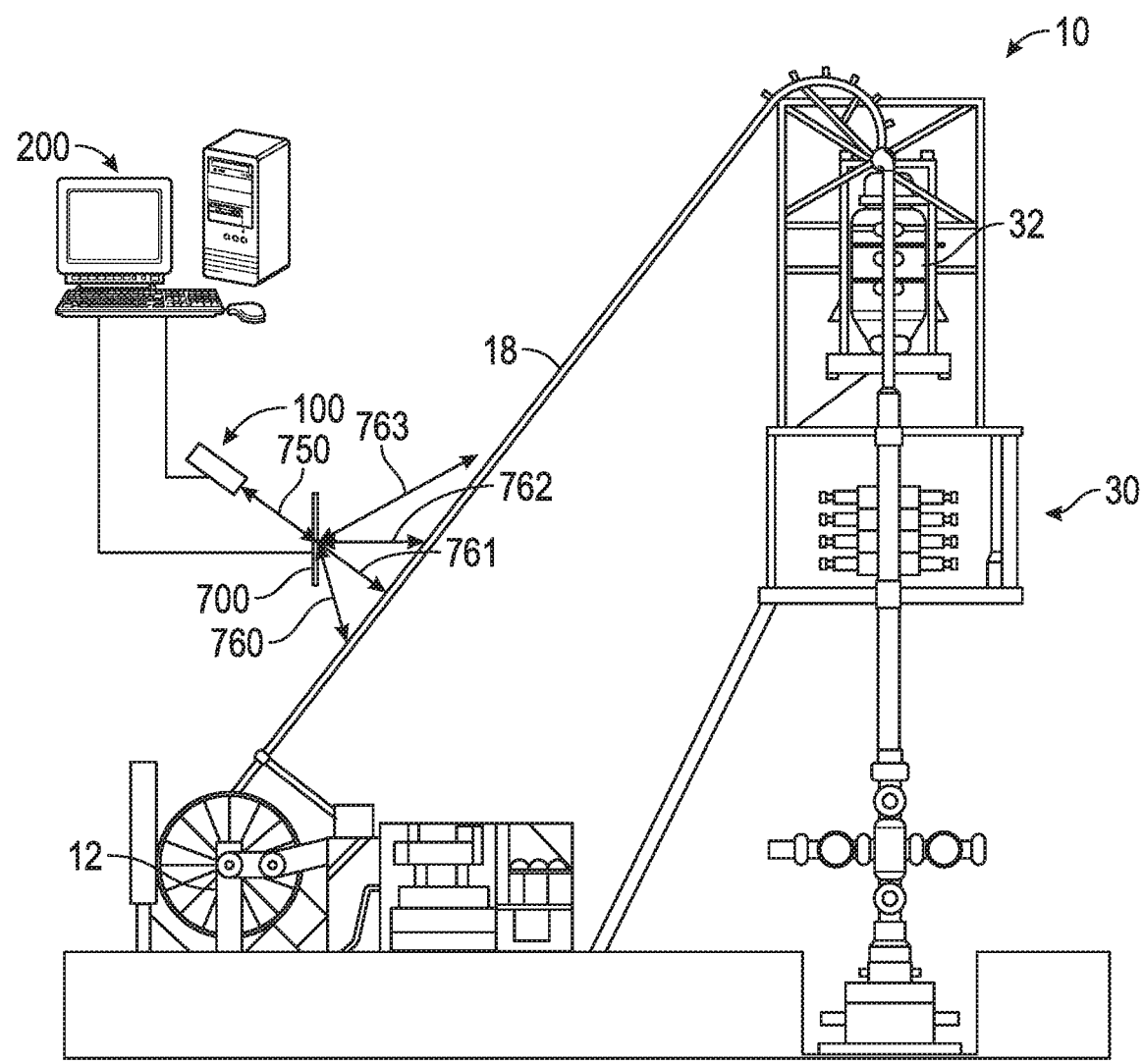
FIG. 7B illustrates another example of an acoustic receiver with a deflector.

FIGS. 7A and 7B illustrate exemplary systems 10 including a deflector 700 to direct the optical beam 750 of the optical vibrometer 100 to measure the vibrations from the compressional waves created by the acoustic transmitter 52 at two or more locations along the conduit 18. In at least one example, the deflector 700 can include a mirror. In some examples, the deflector 700 can include a rotating mirror which can rotate or pivot about an axis to direct the optical beam 750 of the optical vibrometer 100 to multiple locations. In some examples, the deflector 700 can include fixed, partially-transparent mirrors. In some examples the size of the mirror can range from about 1 micron to about 6 inches. In some examples, the deflector 700 can include refractive elements such as a mechanically adjustable prism, an acousto-optic modulator, an electro-optic modulator, a phase plate, a spatial light modulator, an adjustable dichroic mirror, and/or a liquid crystal modulator.

The deflector 700 can be coupled with the controller 200 such that the controller 200 can adjust, for example rotate, the deflector 700 to direct the optical beams 750 to the desired locations at the desired times. The detected components of the waves at the multiple locations can be combined to increase telemetry signal-to-noise ratio using noise cancellation methodologies. For example, as illustrated in FIG. 7A, the deflector 700 can rotationally deflect the optical beam 750 to the single point of reference 180 as discussed above and illustrated as beam 751 as well as a beam 752 to another location such as a location on and/or near the injector 32. The second signal from beam 752 can be combined with the signal from the single point of reference 180 to increase telemetry signal-to-noise ratio using noise cancellation methodologies. In at least one example, the radial component of a wave propagating through the conduit 18 can be extracted utilizing the deflector 700 and/or by carefully selecting an appropriate location on the injector 32. In at least one example, one or more retroreflectors can be positioned at the locations where the deflector 700 may direct the optical beams 750. The retroreflectors can direct the reflections 160 back in the same path as the optical beam 750.

As illustrated in FIG. 7B, the deflector 700 can be operable to rotate and deflect the optical beam 750 to one or more additional points of reference on the conduit 18 such that additional waves are measured. For example, beams 760, 761, 762, 763 illustrate beams that have been directed by the deflector 700 to a plurality of additional points of reference on the conduit 18. The controller 200 can determine additional signals transmitted from the acoustic transmitter 52 based on the additional waves of the conduit 18. The controller 200 can also reduce noise by comparing, averaging, and/or convolving the compressional waves from the signal point of reference 180 and the additional waves from the additional points of reference.

The deflector 700 can be time-multiplied such that the optical vibrometer 100 can measure components of the waves at multiple points along the conduit 18, for example between the reel 12 and the injector 32. The deflector 700 in such an example functions similarly to having multiple acoustic receivers with spatial diversity. In other examples, multiple acoustic receivers can be included to measure components of the waves at multiple points along the conduit 18. Note that each of the acoustic receivers would have the ability to independently detect components of the waves and determine the signal and data conveyed by the acoustic transmitter 52. Spatial diversity of the acoustic receiver 100 can be used to further increase signal-to-noise ratio. To account for the differing work distances, the optical beams 150 within the optical vibrometer 100 would change orientation, frequency, focal length, coherence length, and/or optical power in order to ensure overlap of the optical beam 150 at the point of reference. An active feedback and control system, for example from the controller 200, can be used to ensure proper alignment and an optimized signal-to-noise ratio. In some examples, the deflector 700 may include its own controller, similar to controller 200.

In at least one example, the deflector 700 can rotate or adjust the optical transmitter 100 itself to direct the optical beam 750 to a desired location. For example, the optical emitter 102 can be rotated or adjusted such that the optical emitter 102 points to the desired location.

Figure 8:
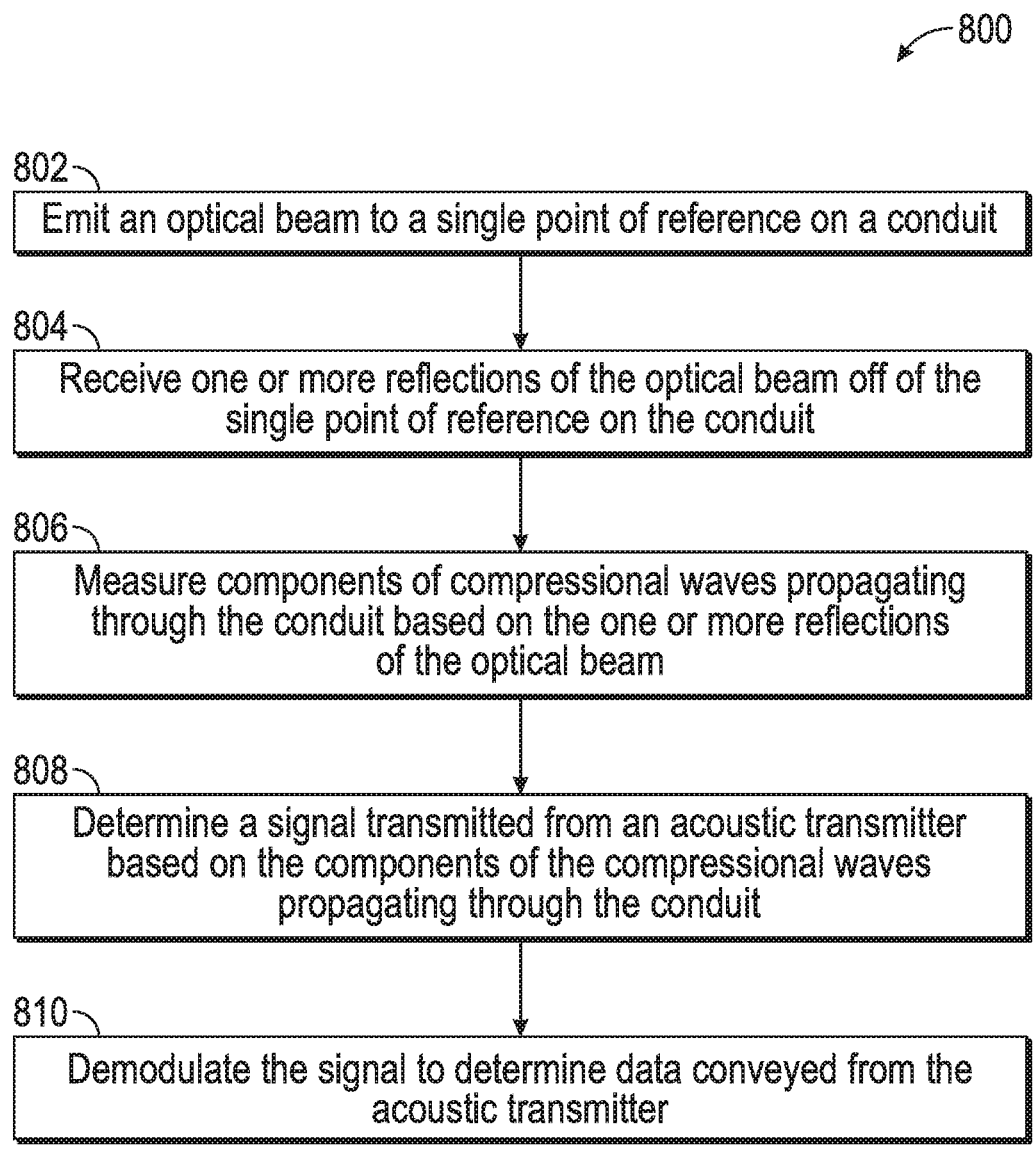
FIG. 8 is a flow chart of a method for utilizing an acoustic telemetry system.

Referring to FIG. 8, a flowchart is presented in accordance with an example embodiment. The method 800 is provided by way of example, as there are a variety of ways to carry out the method. The method 800 described below can be carried out using the configurations illustrated in FIGS. 1A-7B, for example, and various elements of these figures are referenced in explaining example method 800. Each block shown in FIG. 8 represents one or more processes, methods or subroutines, carried out in the example method 800. Furthermore, the illustrated order of blocks is illustrative only and the order of the blocks can change according to the present disclosure. Additional blocks may be added or fewer blocks may be utilized, without departing from this disclosure. The example method 800 can begin at block 802.

At block 802, an acoustic receiver emits an optical beam to a single point of reference on a conduit. The acoustic receiver can include an optical emitter which can emit the optical beam.

At block 804, the acoustic receiver can receive one or more reflections of the optical beam off of the single point of reference on the conduit. The acoustic receiver can include an optical receiver which can receive the reflections of the optical beam. With the received reflections of the optical beam, the acoustic receiver is able to detect components of compressional waves that are created by an acoustic transmitter. In some examples, as discussed above, torsional and/or flexural waves can be created instead of and/or in addition to the compressional waves. The acoustic transmitter creates compressional waves to convey a signal with data to the acoustic receiver.

At block 806, a processor, for example in a controller, can measure components of the compressional waves propagating through the conduit based on the one or more reflections of the optical beam. The components of the compressional waves can include velocities, distances, and/or accelerations of the compressional waves. In some examples, the controller can determine flexural components of the waves. The components of the flexural waves can include bending angle, outer and inner diameters, and associated dynamics of bending and radial expansion and/or contraction. In some examples, the controller can determine torsional components of the waves. The components of the torsional waves can include angular velocities, angular distances, and/or angular accelerations of the torsional waves.

At block 808, the processor can determine a signal transmitted form the acoustic transmitter based on the components of the compressional waves propagating through the conduit.

At block 810, the processor can demodulate the signal to determine data conveyed from the acoustic transmitter. For example, the data can include measurements from sensors downhole. In some examples, the data can include instructions for a downhole tool. Based on the signal and data, adjustments to the system can be made. For example, the data can include wellbore data such as temperature, pressure, casing collar locations, radiation levels, tool weights, and/or fluid composition taken from sensors of the downhole tool. The data can be received by the acoustic receiver, and input into logs and/or simulations. Based on such data, adjustments may be made such as closing sections of the well, stimulation of the formation, or any other suitable actions. Additionally, if the data is being transmitted to an acoustic receiver disposed downhole and in communication with a downhole tool, the downhole tool may be adjusted, for example opening or closing valves.

Numerous examples are provided herein to enhance understanding of the present disclosure. A specific set of statements are provided as follows.

Statement 1: An acoustic receiver is disclosed comprising: an optical vibrometer having an optical emitter and an optical receiver, the optical emitter operable to emit an optical beam to a single point of reference on a conduit, and the optical receiver operable to receive one or more reflections of the optical beam off of the single point of reference on the conduit, thereby detecting waves propagating through the conduit created by an acoustic transmitter; and a processor coupled with the optical emitter and the optical receiver, the processor being operable to: determine components of the waves created by the acoustic transmitter based on the one or more reflections of the optical beam; and determine a signal transmitted from the acoustic transmitter based on the components of the waves.

Statement 2: An acoustic receiver is disclosed according to Statement 1, wherein the components of the waves include velocities of the waves.

Statement 3: An acoustic receiver is disclosed according to Statements 1 or 2, wherein the optical beam includes a single beam.

Statement 4: An acoustic receiver is disclosed according to any of preceding Statements 1-3, wherein the optical beam includes a plurality of beams which converge at the single point of reference on the conduit.

Statement 5: An acoustic receiver is disclosed according to any of preceding Statements 1-4, wherein the processor is further operable to: demodulate the signal to determine data conveyed from the acoustic transmitter.

Statement 6: An acoustic receiver is disclosed according to Statement 5, wherein the processor is further operable to: determine longitudinal components of the waves.

Statement 7: An acoustic receiver is disclosed according to Statements 5 or 6, wherein the processor is further operable to: determine torsional components of the waves.

Statement 8: An acoustic receiver is disclosed according to any of preceding Statements 1-7, further comprising: a deflector operable to rotate and deflect the optical beam to one or more additional points of reference on the conduit such that additional waves are measured, wherein the processor is further operable to: determine additional signals transmitted from an acoustic transmitter based on the additional waves of the conduit; and reduce noise by comparing the waves from the single point of reference and the additional waves from the additional points of reference.

Statement 9: A system is disclosed comprising: a conduit disposed in a wellbore through a wellhead; an acoustic transmitter coupled with the conduit, the acoustic transmitter operable to transmit a signal by creating waves to propagate through the conduit, and the optical receiver operable to receive one or more reflections of the optical beam off of the single point of reference on the conduit, thereby detecting the wave created by the acoustic transmitter; and a processor coupled with the optical emitter and the optical receiver, the processor being operable to: determine components of the waves created by the acoustic transmitter based on the one or more reflections of the optical beam; and determine a signal transmitted from the acoustic transmitter based on the components of the waves.

Statement 10: A system is disclosed according to Statement 9, wherein the components of the waves include velocities of the waves.

Statement 11: A system is disclosed according to Statements 9 or 10, wherein the acoustic receiver is disposed on the surface, the acoustic transmitter is disposed in the wellbore, and the acoustic transmitter is communicatively coupled with a downhole tool.

Statement 12: A system is disclosed according to any of preceding Statements 9-11, wherein the acoustic receiver is disposed in the wellbore, the acoustic transmitter is disposed on the surface, and the acoustic receiver is communicatively coupled with a downhole tool, wherein the downhole tool is adjusted based on the signal measured by the acoustic receiver.

Statement 13: A system is disclosed according to any of preceding Statements 9-12, wherein the processor is further operable to: demodulate the signal to determine data conveyed from the acoustic transmitter.

Statement 14: A system is disclosed according to Statement 13, wherein the processor is further operable to: determine longitudinal components of the waves.

Statement 15: A system is disclosed according to Statements 13 or 14, wherein the processor is further operable to: determine torsional components of the waves.

Statement 16: A system is disclosed according to any of preceding Statements 9-15, wherein the acoustic receiver further includes: a deflector operable to rotate and deflect the optical beam to one or more additional points of reference on the conduit such that additional waves are measured, wherein the processor is further operable to: determine additional signals transmitted from an acoustic transmitter based on the additional waves of the conduit; and reduce noise by comparing the waves from the single point of reference and the additional waves from the additional points of reference.

Statement 17: A method is disclosed comprising: emitting, by an acoustic receiver, an optical beam to a single point of reference on a conduit; receiving, by the acoustic receiver, one or more reflections of the optical beam off of the single point of reference one the conduit; measuring, by a processor, components of waves propagating through the conduit based on the one or more reflections of the optical beam; determining, by the processor, a signal transmitted from an acoustic transmitter based on the components of the waves propagating through the conduit; and demodulating, by the processor, the signal to determine data conveyed from the acoustic transmitter.

Statement 18: A method is disclosed according to Statement 17, wherein the components of the waves include velocities of the waves.

Statement 19: A method is disclosed according to Statements 17 or 18, further comprising: determining longitudinal components of the waves.

Statement 20: A method is disclosed according to any of preceding Statements 17-19, further comprising: determining torsional components of the waves.

The disclosures shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. An acoustic receiver comprising:
an optical vibrometer having an optical emitter and an optical receiver, the optical emitter operable to emit a plurality of optical beams directly to a single point of reference on a conduit, and the optical receiver operable to receive one or more reflections of the plurality of optical beams off of the single point of reference on the conduit, thereby detecting waves propagating through the conduit created by an acoustic transmitter, wherein the plurality of optical beams emitted directly from the optical emitter converge at the single point of reference on the conduit, and wherein a first optical beam and a second optical beam of the plurality of optical beams are two counter-propagating beams that have a different orientation and a different frequency value; and
a processor coupled with the optical emitter and the optical receiver, the processor being operable to:
determine components of the waves created by the acoustic transmitter based on the one or more reflections of the plurality of optical beams; and
determine a signal transmitted from the acoustic transmitter based on the components of the waves.

2. The acoustic receiver of claim 1, wherein the components of the waves include velocities of the waves.

3. The acoustic receiver of claim 1, wherein the processor is further operable to:
demodulate the signal to determine data conveyed from the acoustic transmitter.

4. The acoustic receiver of claim 3, wherein the processor is further operable to:
determine longitudinal components of the waves.

5. The acoustic receiver of claim 3, wherein the processor is further operable to:
determine torsional components of the waves.

6. The acoustic receiver of claim 1, further comprising:
a deflector operable to rotate and deflect at least one of the plurality of optical beams to one or more additional points of reference on the conduit such that additional waves are measured, wherein the processor is further operable to:
   determine additional signals transmitted from the acoustic transmitter based on the additional waves of the conduit; and
   reduce noise by comparing the waves from the single point of reference and the additional waves from the one or more additional points of reference.

7. A system comprising:
a conduit disposed in a wellbore through a wellhead;
an acoustic transmitter coupled with the conduit, the acoustic transmitter operable to transmit a signal by creating waves to propagate through the conduit; and
an acoustic receiver including:
   an optical vibrometer having an optical emitter and an optical receiver, the optical emitter operable to emit a plurality of optical beams directly to a single point of reference on the conduit, and the optical receiver operable to receive one or more reflections of the plurality of optical beams off of the single point of reference on the conduit, thereby detecting the waves created by the acoustic transmitter, wherein the plurality of optical beams emitted directly from the optical emitter converge at the single point of reference on the conduit, and wherein a first optical beam and a second optical beam of the plurality of optical beams are two counter-propagating beams that have a different orientation and a different frequency value; and
   a processor coupled with the optical emitter and the optical receiver, the processor being operable to:
      determine components of the waves created by the acoustic transmitter based on the one or more reflections of the plurality of optical beams; and
      determine the signal transmitted from the acoustic transmitter based on the components of the waves.

8. The system of claim 7, wherein the components of the waves include velocities of the waves.

9. The system of claim 7, wherein the acoustic receiver is disposed on a surface, the acoustic transmitter is disposed in the wellbore, and the acoustic transmitter is communicatively coupled with a downhole tool.

10. The system of claim 7, wherein the acoustic receiver is disposed in the wellbore, the acoustic transmitter is disposed on a surface, and the acoustic receiver is communicatively coupled with a downhole tool,
wherein the downhole tool is adjusted based on the signal measured by the acoustic receiver.

11. The system of claim 7, wherein the processor is further operable to:
demodulate the signal to determine data conveyed from the acoustic transmitter.

12. The system of claim 11, wherein the processor is further operable to:
determine longitudinal components of the waves.

13. The system of claim 11, wherein the processor is further operable to:
determine torsional components of the waves.

14. The system of claim 7, wherein the acoustic receiver further includes:
a deflector operable to rotate and deflect at least one of the plurality of optical beams to one or more additional points of reference on the conduit such that additional waves are measured,
wherein the processor is further operable to:
   determine additional signals transmitted from the acoustic transmitter based on the additional waves of the conduit; and
   reduce noise by comparing the waves from the single point of reference and the additional waves from the one or more additional points of reference.

15. A method comprising:
emitting, by an acoustic receiver, a plurality of optical beams directly to a single point of reference on a conduit wherein the plurality of optical beams emitted directly from the acoustic receiver converge at the single point of reference on the conduit, and wherein a first optical beam and a second optical beam of the plurality of optical beams are two counter-propagating beams that have a different orientation and a different frequency value;
receiving, by the acoustic receiver, one or more reflections of the plurality of optical beams off of the single point of reference on the conduit;
measuring, by a processor, components of waves propagating through the conduit based on the one or more reflections of the plurality of optical beams;
determining, by the processor, a signal transmitted from an acoustic transmitter based on the components of the waves propagating through the conduit; and
demodulating, by the processor, the signal to determine data conveyed from the acoustic transmitter.

16. The method of claim 15, wherein the components of the waves include velocities of the waves.

17. The method of claim 15, further comprising:
determining longitudinal components of the waves.

18. The method of claim 15, further comprising:
determining torsional components of the waves.

19. The method of claim 15, further comprising:
demodulating the signal to determine data conveyed from the acoustic transmitter.

20. The method of claim 15, further comprising:
rotating and deflecting, by a deflector, at least one of the plurality of optical beams to one or more additional points of reference on the conduit such that additional waves are measured;
determining, by the processor, additional signals transmitted from the acoustic transmitter based on the additional waves of the conduit; and
reducing noise, by the processor, by comparing the waves from the single point of reference and the additional waves from the one or more additional points of reference.

* * * * *